J. Kinzer,
Furniture Caster.
No 19,369.  Patented Feb. 16, 1858.

UNITED STATES PATENT OFFICE.

JACOB KINZER, OF PITTSBURGH, PENNSYLVANIA.

CASTER FOR FURNITURE.

Specification of Letters Patent No. 19,369, dated February 16, 1858.

*To all whom it may concern:*

Be it known that I, JACOB KINZER, of the city of Pittsburgh, county of Allegheny, State of Pennsylvania, have invented a new and useful Improvement in Casters for Furniture; and I do hereby declare the following to be a full, clear, and exact description thereof, reference being had to the annexed drawing, forming part of this specification, in which—

Figure 4:
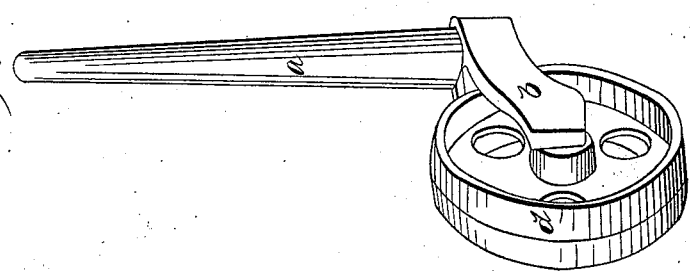
Figure 3:
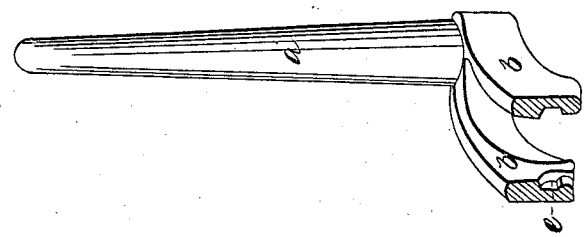
Figure 2:
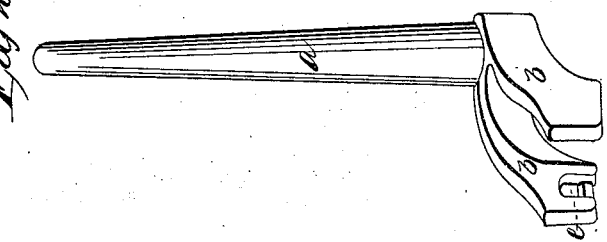
Figure 5:
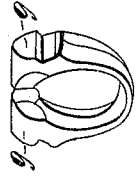
Figure 1:
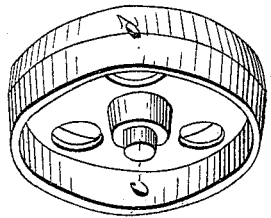

Figure 1 is a perspective view of the roller of the caster. Fig. 2 is a perspective view of the shank of the caster, the roller being removed. Fig. 3 is a sectional view through the axis of the roller, showing the recesses and shoulders in the shank. Fig. 4 is a perspective representation of the caster with the roller in place in the shank. Fig. 5 is a representation of the drill used in casting the shank of the caster, to form the recess and shoulder.

In the several figures like letters of reference denote similar parts of my caster.

My invention consists in an improvement in the construction of casters for furniture which have the shank and its body cast in one piece, and the pivot and its arm in another, by constructing the shank as hereinafter described with a deep recess on each arm of the shank to receive the ends of the axis of the roller, with a shoulder or collar above the recess to serve as a bearing for the axis of the roller, thus dispensing with the necessity of drilling the roller or shank for the reception of the axis.

The usual mode of constructing casters is to insert the axis of the roller through holes drilled near the extremities of the arms of the shank. The axis of the roller is usually a pin of wrought iron, on which the roller turns, but is sometimes made of one piece with the roller itself. The pin, or axis, is however very apt to break, or bend, or work loose from the shank, in which case the roller will either drop out, or cease to turn freely: and the hole drilled in the ends of the arms of the shank, weakens that part of the caster so much that it is apt to break. The drilling of the holes in the shank, and riveting of the pin or axis, in its place, add greatly to the trouble of manufacture, and consequently to the expense of the article.

To enable others skilled in the art to make and use my improved caster I will proceed to describe its construction and operation.

In the drawings *a* is the shank of the caster, having two arms *b*, *b*, extending from its lower extremity at right angles to it, or nearly so, and parallel to each other, with a space between the arms sufficient to receive the roller *d*. The shank and arms are made of iron brass or other suitable metal. The roller *d* is also of iron, or brass, having an axis *c*, which may be separate from the roller, but strength and economy of construction make it preferable to have them cast in one piece, as shown in the drawings. The axis *c* projects on each side from the face of the roller, about one eighth of an inch or thereabout, far enough to give sufficient bearing in the recesses in the arms of the shank, without interfering with the free play of the roller *d* between the arms *b*, *b*, of the shank. There is a recess *e* in each of the arms *b*, *b*, of the shank, in the proper position to receive the extremities of the axis *c* of the roller. The shape of these recesses *e*, *e*, is shown in Fig. 2, and in section in Fig. 3. The width of the recesses is sufficient to give the axis *c* of the roller free play; the top of the recess is arched and forms a shoulder or collar to serve as a bearing for the axis. The depth of the recess is greatest immediately under the collar, so as to receive the axis of the roller. At the lower edge of the arm *b*, the recess is nearly as deep as at the point under the collar, where the extremity of the axis rests when in place, but from that point upward the depth is gradually diminished for a short distance, and then suddenly increased, thus forming a wedge shaped obstruction to the entrance of the axis *c* into the recess *e* under the collar, the base of the wedge forming the under bearing of the axis, and preventing it from falling out of place after it is once introduced into the recess. Thus when the roller is to be inserted between the arms of the shank the extremities of the axis entering the recess on the under edge of the arms *b*, *b*, but meeting with the obstruction caused by the wedge shaped passage into the recess under the collar, has to be forced up the inclined plane on either side, the arms *b* *b* yielding laterally, sufficiently to enable the axis *c* to pass over the obstruction and enter the recess *e* under the collar. When in this position the roller will remain in place, unless forcibly removed, as the weight of the furniture presses the journal of the axis against the arched collar or shoulder above the recess, and the ridge formed by the sudden deepening of the recess being sufficient to keep the roller in place, as it is not when in use, subjected to sufficient force to displace it.

The caster may thus be made in two pieces, viz, the shank (Fig. 2) and the roller (Fig. 1,) and is put together by simply pressing the roller into place between the arms. There is no drilling of a hole for the axis or pin of the roller, either through the arms of the shank or through the roller, and the caster thus made is much stronger and less liable to get out of repair than casters constructed on the plan heretofore in use.

The practical utility of my mode of constructing casters, depends, not simply on having a recess in the arms of the shank, such, for instance as that made in buckles for the insertion of the tongue of the buckle, but in making a recess of the peculiar construction hereinbefore described; for, in order to give the axis of the roller such a bearing as to enable it to sustain the weight of the furniture (to which it is attached) without displacement, the recess must be much deeper at the sides and upper part than the distance which the arms of the shank would yield laterally to admit of the insertion of the axis, the arms of the shank being of cast metal and necessarily short and strong will not admit of much spring. It is the peculiarity of the recess I employ, that its walls or sides are straight and not inclined, and that the collar and sides give a depth around the axis of the roller sufficient to keep it in place notwithstanding the force constantly exerted, whenever heavy furniture is moved, to force the roller from its socket; and yet the entrance to the recess is such, by the wedge-like shape of the obstruction, that the arms will gradually yield to the axis of the roller, and yet prevent its return after it is forced up into the recess. To secure this peculiar shape of recess I employ a small chill against which the extremity of the arms of the caster is cast, which secures uniformity of shape and size of the recesses, and makes them so smooth that no fitting or cleaning is necessary to prepare it to receive the axis of the roller. This chill is shown in Fig. 5. The head of the chill, marked $g$ forms the deepest part of the recess, and the inclined plane or obstruction over which the axis of the roller must pass to enter the recess. The head $g$ of the chill is placed in the recess in the pattern used for making the mold in which the shank is to be cast, and when the pattern is withdrawn from the mold the chill is left behind. The chill being of horseshoe form, (see Fig. 5) is removed from the arms of the caster, when it is cold, by pressing it together near the head $g$, $g$, when it may be withdrawn readily from the recess. The chill forms, of course, no part of the caster, but as the use of it insures the necessary accuracy in the construction of the recess in the arms of the shank I think it proper thus minutely to describe its construction and use.

What I claim as my invention and desire to secure by Letters Patent is—

The improved mode of constructing casters for furniture, hereinbefore described, (having the shank of its body cast in one piece, and the roller and its pivot in another) by making in each arm of the shank a deep recess with a collar above and a wedge shaped entrance from beneath, for the purpose of receiving the axis or rim of the roller in the manner hereinbefore described, the recess to hold the roller in place when there is no weight upon it, and the collar to serve as a bearing for the journals of the axis, to sustain the weight it has to support.

In testimony whereof I have hereunto set my hand, this seventeenth day of December A. D. 1857.

JACOB KINZER.

Witnesses:
  MARTIN G. CUSHING,
  L. P. STONE.